Nov. 22, 1960    J. M. STOGNER ET AL    2,961,045
ASSEMBLY FOR INJECTING BALLS INTO A FLOW STREAM
FOR USE IN CONNECTION WITH OIL WELLS
Filed Dec. 6, 1957
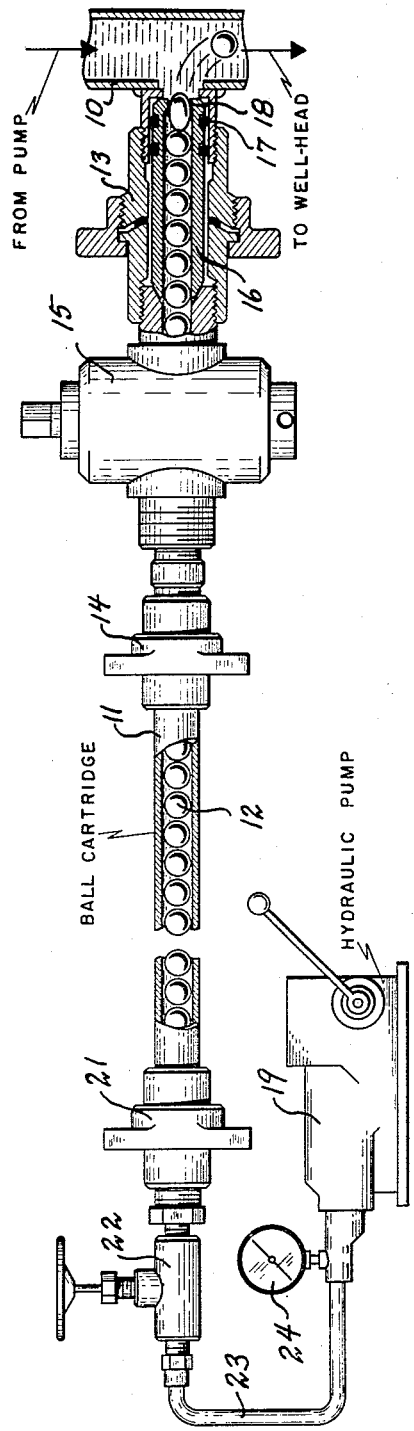
INVENTORS.
JOEL M. STOGNER,
THOMAS L. BROWN,
BY  JACK C. McGUIRE,
Earl Babcock.
ATTORNEY.

United States Patent Office 2,961,045
Patented Nov. 22, 1960

2,961,045

ASSEMBLY FOR INJECTING BALLS INTO A FLOW STREAM FOR USE IN CONNECTION WITH OIL WELLS

Joel M. Stogner, Thomas L. Brown, and Jack C. McGuire, Duncan, Okla., assignors to Halliburton Oil Well Cementing Company, Duncan, Okla.

Filed Dec. 6, 1957, Ser. No. 701,219

1 Claim. (Cl. 166—75)

This invention relates to apparatus for use in connection with oil wells and more particularly to an arrangement for injecting rubber balls or the like into a stream of fluid flowing into a well. It has become common practice to temporarily plug perforations in casing in a well with rubber balls or the like, particularly in connection with the fracturing of oil well formations. Methods for temporarily closing perforations in the casing of a well are disclosed in the copending application of Donald H. Crall, Serial 650,076, filed April 2, 1957, and in the patent to Derrick et al., 2,754,910, granted July 17, 1956.

As disclosed in the Crall application and in the Derrick patent mentioned above, the balls used for temporarily plugging perforations in casing may be made in various ways, but all have a certain amount of flexibility or elasticity. In some cases, ordinary rubber balls are used.

The present invention relates to a modification or improvement over the assembly for use in fracturing oil wells disclosed and claimed in the copending application, Serial No. 700,808, filed on or about December 4, 1957, by Joel M. Stogner and Jack C McGuire.

The object of the present invention is to devise apparatus for accurately counting the number of balls injected into a stream of fluid which is being pumped into the casing of a well, and where desired, for injecting the balls one at a time with any desired time interval in between each injection.

The manner in which these and other objects of the invention are accomplished will be apparent from the following description taken in connection with the accompanying drawing in which:

The single figure is a view in side elevation with certain parts cut away showing apparatus constructed in accordance with the invention connected to a flow line from a pump to a well head.

Referring to the drawing in detail, it will be observed that there is disclosed apparatus which is capable of feeding elastic balls into a flow line from a pump to an oil well one at a time and that some means is provided for counting these balls as they are injected into the flow line.

The flow line is indicated at 10. A cartridge 11 containing elastic balls 12 is connected to the flow line 10 by means of suitable unions 13 and 14 and the necessary pipe couplings, there being a valve 15 in the assembly.

The ball cartridge 11 has a tube 16 associated with it and clamped in place. The tube 16 is provided with suitable O-rings 17 so that the balls and the fluid which moves them must flow through the tube 16.

The discharge end of the tube 16 is provided with a restriction 18 smaller than the normal diameter of the balls so that each ball as it passes through the tube is flexed or forced into a distorted position, as illustrated. The arrangement is such that the balls pop through the restriction 18 one at a time.

The inlet end of the cartridge 11 is connected to a manually operable hydraulic pump 19. The arrangement for making this connection includes the union 21, the valve 22 and the line 23. The pressure gauge 24 is mounted on the pump 19 or in the line 23.

The pump 19 is capable of creating enough pressure to exceed that in the flow line 10 and cause the balls 12 to enter the flow line 10.

The operation of the arrangement is as follows:

Assuming that the assembly is connected to the flow line 10 as illustrated, the valves 15 and 22 are opened and the hydraulic pump 19 is then actuated until the balls move into the tube 16 and the first one pops into the flow line 10. Due to the popping action caused by the restriction 18, the needle of the pressure gauge 24 will flicker due to the sudden change in the pressure as the ball pops through the restriction. As the operator works the pump 19, he will be in a position to observe the flicker of the needle of the gauge 24, and this physical observation will enable him to count the number of balls which are popped into the flow line 10. Since the pump 19 can be operated slowly, the arrangement is such that the balls 12 can be fed into the flow line 10 slowly or at any desired time intervals.

The arrangement of the figure is, of course, such that after all of the balls in the cartridge 11 have been injected into the flow line 10, the valve 15 may be closed and the cartridge 11 reloaded or another cartridge substituted for it.

While only one embodiment of the invention has been shown and described herein, it will be obvious to those skilled in the art that various changes may be made in the construction and arrangement of the parts without departing from the spirit of the invention or the scope of the annexed claim.

We claim:

An assembly for injecting balls, one at a time, into a flow line conveying fluid to an oil well or the like, the combination with the flow line of a cartridge connected to said flow line and containing a number of elastic balls, means providing a restriction at the discharge end of said cartridge smaller than the normal diameter of said balls, whereby, when a ball passes through said means it flexes to temporarily seal the outlet end of said cartridge and creates a pressure surge in the cartridge, a pump, a conduit connecting the pump to the inlet side of said cartridge whereby pressure applied by said pump is transmitted to the inlet side of said cartridge and transmitted by adjacent balls through said cartridge so as to bias said balls substantially as a unit toward the outlet side of said cartridge and effect successive expulsion of said balls from said cartridge, and a pressure gauge in said conduit, whereby the pressure surges created in said cartridge by the flexing of individual balls as they pass said restriction are reflected on the pressure gauge so that an operator, upon visual observation of the gauge can count the number of balls as they are injected into the flow line.

References Cited in the file of this patent

UNITED STATES PATENTS

| | | |
|---|---|---|
| 1,879,047 | Betts | Sept. 27, 1932 |
| 2,272,673 | Kennedy | Feb. 10, 1942 |
| 2,306,747 | Ojalvo | Dec. 29, 1942 |
| 2,604,577 | Strickland et al. | July 22, 1952 |
| 2,634,098 | Armentrout | Apr. 7, 1953 |
| 2,698,582 | Vincent | Jan. 4, 1955 |
| 2,754,910 | Derrick et al. | July 17, 1956 |
| 2,790,500 | Jones | Apr. 30, 1957 |

FOREIGN PATENTS

| | | |
|---|---|---|
| 4,622 of 1906 | Great Britain | Dec. 13, 1906 |